US009493228B2

(12) United States Patent
Herzberg et al.

(10) Patent No.: US 9,493,228 B2
(45) Date of Patent: Nov. 15, 2016

(54) HIGH HEAT TRANSFER RATE REUSABLE THERMAL PROTECTION SYSTEM

(71) Applicant: The Boeing Company, Chicago, IL (US)

(72) Inventors: James S. Herzberg, Long Beach, CA (US); Robert J. Budica, Laguna Hills, CA (US); Frank O. Chandler, Huntington Beach, CA (US); Joseph W. Haney, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1149 days.

(21) Appl. No.: 13/688,195

(22) Filed: Nov. 28, 2012

(65) Prior Publication Data

US 2015/0354907 A1 Dec. 10, 2015

(51) Int. Cl.
*B64C 1/38* (2006.01)
*F28F 13/06* (2006.01)
*B23P 15/26* (2006.01)
*B64D 13/00* (2006.01)
*B64C 3/36* (2006.01)
*B64G 1/58* (2006.01)

(52) U.S. Cl.
CPC .................. *B64C 1/38* (2013.01); *B23P 15/26* (2013.01); *B64C 3/36* (2013.01); *B64D 13/006* (2013.01); *B64G 1/58* (2013.01); *F28F 13/06* (2013.01); *Y10T 29/49352* (2015.01)

(58) Field of Classification Search
CPC ......... B64D 13/006; B64C 1/38; B64C 3/36; B64G 1/50; B64G 1/58
USPC .................................................... 244/117 A
See application file for complete search history.

(56) References Cited

U.S. PATENT DOCUMENTS

| 2,908,455 A | * | 10/1959 | Hoadley | B64D 13/006 137/67 |
|---|---|---|---|---|
| 3,180,111 A | * | 4/1965 | Rannenberg | F25D 7/00 165/135 |
| 4,923,146 A | * | 5/1990 | Anthony | B64C 1/38 244/117 A |
| 4,991,797 A | | 2/1991 | Miller et al. | |
| 5,325,880 A | * | 7/1994 | Johnson | F15C 3/04 137/1 |
| 5,330,124 A | * | 7/1994 | Le Touche | B64G 1/58 165/110 |
| 6,149,123 A | * | 11/2000 | Harris | F15C 5/00 251/11 |

(Continued)

FOREIGN PATENT DOCUMENTS

| CN | 1816646 | 8/2006 |
|---|---|---|
| CN | 1832883 | 9/2006 |

(Continued)

OTHER PUBLICATIONS

Office Action Issued in Canadian Patent Application No. 2829743 dated Feb. 18, 2015.

(Continued)

*Primary Examiner* — Justin Rephann
(74) *Attorney, Agent, or Firm* — McDonnell Boehnen Hulbert & Berghoff LLP

(57) ABSTRACT

A system and methods for high heat transfer rate reusable thermal protection are presented. A porous skin comprises an exposed exterior surface and a non-exposed surface, and a coolant reservoir comprises perforations coupled to the non-exposed surface, and valves. The valves regulate a flow of coolant from the coolant reservoir to the porous skin in response to a temperature of the porous skin.

20 Claims, 5 Drawing Sheets

(56) References Cited

U.S. PATENT DOCUMENTS

| | | | |
|---|---|---|---|
| 6,626,417 B2* | 9/2003 | Winger | F15C 5/00 251/129.01 |
| 7,011,288 B1* | 3/2006 | Slicker | F15C 5/00 251/11 |
| 8,534,570 B2* | 9/2013 | Tiliakos | 137/74 |
| 2004/0245389 A1 | 12/2004 | Behrens et al. | |
| 2006/0060702 A1* | 3/2006 | Behrens | B64C 1/38 244/117 A |
| 2007/0113932 A1 | 5/2007 | Tiliakos et al. | |
| 2009/0095927 A1* | 4/2009 | McCarthy | G05D 23/08 251/11 |

FOREIGN PATENT DOCUMENTS

| | | | |
|---|---|---|---|
| JP | | 2000130379 A | 5/2000 |
| WO | WO 2005064161 A1 | | 7/2005 |

OTHER PUBLICATIONS

Office Action issued in Canadian patent Application No. 2,829,743 dated Jan. 7, 2016.

Office Action issued in Chinese Patent Application No. 20130625033.0 dated Jul. 29, 2016 (7 pages).

* cited by examiner

HIGH HEAT TRANSFER RATE REUSABLE THERMAL PROTECTION SYSTEM

FIELD

Embodiments of the present disclosure relate generally to thermal protection. More particularly, embodiments of the present disclosure relate to high heat transfer rate thermal protection systems.

BACKGROUND

Vehicles travelling through the atmosphere may be subject to heating effects such as friction. A vehicle skin generally comprises high temperature materials to withstand these heating effects and resulting high temperatures. The high temperature materials are generally load bearing hot structures that may be vulnerable to anomaly and may take excessive time for maintenance service.

SUMMARY

A system and methods for high heat transfer rate reusable thermal protection are presented. A porous skin comprises an exposed exterior surface and a non-exposed surface, and a coolant reservoir comprises perforations coupled to the non-exposed surface, and valves. The valves regulate a coolant flow of coolant from the coolant reservoir to the porous skin in response to a temperature of the porous skin.

In this manner, embodiments of the disclosure provide a means to protect a vehicle skin able to withstand heating effects and high temperatures.

In an embodiment, a heat dissipation and thermal protection system comprises a porous skin, a coolant reservoir, and valves. The porous skin comprises an exposed exterior surface, and the coolant reservoir comprises perforations coupled to a non-exposed surface of the porous skin, and valves. The valves regulate a flow of coolant from the coolant reservoir through the perforations to the porous skin in response to a temperature of the porous skin.

In another embodiment, a method for forming a heat dissipation and thermal protection system couples a coolant reservoir comprising perforations to a non-exposed surface of a porous skin comprising an exposed exterior surface. The method further configures valves to regulate a flow of a coolant from the coolant reservoir to the porous skin in response to a temperature of the porous skin.

In a further embodiment, a method for operating a heat dissipation and thermal protection system fills a coolant reservoir comprising perforations coupled to a porous skin with a coolant. The method further regulates a flow of coolant from the coolant reservoir through the perforations to the porous skin with valves in response to a temperature of the porous skin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
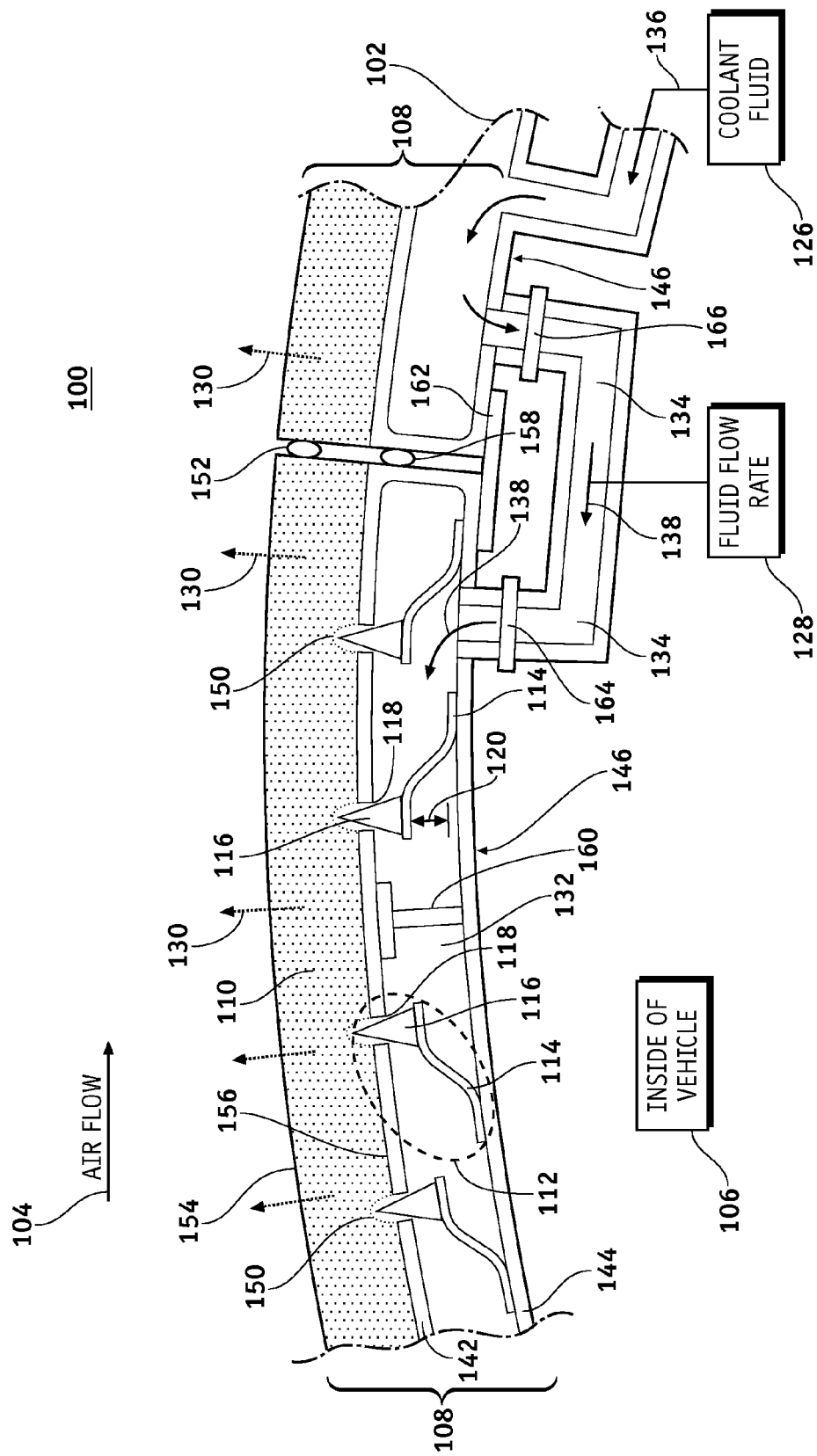
FIG. 1 is an illustration of a cross sectional view of an exemplary high heat transfer rate reusable thermal protection system according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to heat transfer, thermal actuation, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, thermal protection of a vehicle. Embodiments of the disclosure, however, are not limited to such vehicle thermal protection applications, and the techniques described herein may also be utilized in other applications. For example but without limitation, embodiments may be applicable to scientific systems, weapon systems, furnaces, kilns, autoclaves, or other application. The vehicle may comprise, for example but without limitation, manned and unmanned vehicle, spacecraft, planetary entry probe applications, launch vehicles and other vehicle operating in a high temperature environment.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a thermal protection system that is robust (anomaly tolerant), reusable with minimal servicing, lightweight and flexible. Furthermore, embodiments of the disclosure are variable and compliant with a heating rate as it changes during entry flight and from location to location on a vehicle airframe. Furthermore, embodiments can be applicable to low heat rate areas such as undersides and lateral surfaces (e.g., upper surfaces in a wake region with far reduced heating rates). In addition, embodiments can be applicable to leading edges and stagnation point areas, such as those comprising small radius of curvature (sharp) geometries that are required for both high lift to drag ratio (L/D) and air breathing to orbit applications.

FIG. 1 is an illustration of a cross sectional view of an exemplary high heat transfer rate reusable thermal protection system 100 according to an embodiment of the disclosure. System 100 may comprise a plurality of skin structures 108 coupled to each other by a coolant manifold 134 and/or to a coolant feed line 136. A coolant flow 138 of a coolant fluid 126 is introduced into the coolant feed line 136 into the skin structures 108. The skin structures 108 distribute the coolant flow 138 to each other via the coolant manifold 134. The coolant flow 138 is then transpired via a coolant fluid vapor 130 through the skin structures 108 to provide cooling to the skin structures 108 to protect a vehicle 102. The coolant fluid 126 may comprise, for example but without limitation, water, air, a fluorocarbon, a hydrocarbon, liquid nitrogen, liquid hydrogen, liquid oxygen, liquid air, or other coolant fluid.

The skin structure 108 comprises a porous metallic skin 110 (porous skin), a coolant reservoir 146, and a plurality of flow regulation valves 112. A high-speed airflow such as the airflow 104 encountered during, for example, a vehicle re-entry from an orbit, a supersonic flight, or a hypersonic flight can cause aerodynamic heating effects to the skin structures 108. Such aerodynamic heating to the skin structures 108 may comprise temperatures that can climb to, for example, over 1 thousand degrees C. The skin structure 108 may thus need to withstand such aerodynamic and other heating effects and resulting high temperatures.

The skin structure 108 may be coupled to another skin structure 108 via a seal 152, e.g., during assembly. The seal 152 may provide protection to an inside 106 of the vehicle 102 from heat of the airflow 104. A second seal 158 may be used to provide redundant protection to the inside 106 of the vehicle 102 from heat of the airflow 104. The seal 152 and the second seal 158 each may comprise, for example but without limitation, a snap seal, a gasket, a sealant, an adhesive, an O-ring, or other suitable seal. A snap seal may comprise, for example but without limitation, a seal tangentially compressed between two objects such as the skin structure 108, or other seal. The skin structure 108 may be further coupled to another skin structure 108 via a flange 162. The flange 162 may further protect the inside 106 of the vehicle 102 from heat of the airflow 104.

The porous metallic skin 110 (porous skin) comprises a porous structure and/or material such as, but without limitation, an agglomeration of high-temperature alloy metal particles, a sintered/porous metal powder, an open cell metal foam, a porous non-metal, a porous ceramic, a porous composite, or other porous structure. The porous metallic skin 110 can cover a thermally protected structure such as the vehicle 102. The porous metallic skin 110 comprises a non-exposed surface 156 and an exposed surface 154 exposed to the airflow 104 external to the vehicle 102. The non-exposed surface 156 is coupled to an outer reservoir wall 142 of the coolant reservoir 146. The porous metallic skin 110 is filled by the coolant fluid 126, which evaporates via the coolant fluid vapor 130 due to heating and transpires through the exposed surface 154.

The coolant reservoir 146 is configured to contain the coolant fluid 126. The coolant reservoir 146 comprises the outer reservoir wall 142, an inner reservoir wall 144, a plurality of perforations 118 on the outer reservoir wall 142, and the flow regulation valves 112 controlling the coolant flow 138 of the coolant fluid 126 through the perforations 118 into the porous metallic skin 110. The coolant reservoir 146 may further comprise one or more support structure 160 providing structural support between the outer reservoir wall 142 and the inner reservoir wall 144.

The flow regulation valves 112 are configured to be actuated passively in response to a temperature of the coolant fluid 126 in the coolant reservoir 146 to control the coolant flow 138 of the coolant fluid 126 through the perforations 118 into the porous metallic skin 110. The coolant fluid 126 near the flow regulation valve 112 is heated by the porous metallic skin 110 heating the outer reservoir wall 142 near the flow regulation valve 112. The flow regulation valves 112 comprise self-controlling valves configured to control the coolant flow 138 of the coolant fluid 126 at a fluid flow rate 128. The flow regulation valves 112 provide a high fluid flow rate 128 of the coolant flow 138 to high heating areas of the porous metallic skin 110 and a low fluid flow rate 128 of the coolant flow 138 to low heating areas of porous metallic skin 110. The coolant flow 138 increases when a temperature of coolant fluid 126 is high and the coolant flow 138 decreases when the temperature of the coolant fluid 126 is low. Each flow regulation valve 112 of the flow regulation valves 112 allows the coolant flow 138 of the coolant fluid 126 through the perforations 118 into the porous metallic skin 110 based on a temperature of the coolant fluid 126 surrounding the flow regulation valve 112.

Each of the flow regulation valves 112 comprises a valve actuator 114 and a conical flow control poppet 116. The conical flow control poppet 116 is configured to move within a perforation 118 from among the perforations 118 to regulate the coolant flow 138 of the coolant fluid 126 through the perforation 118. A pressure of the coolant flow 138 is configured to exceed a pressure of the airflow 104. The perforation 118 may comprise, for example but without limitation, a cylindrical seat, or other configuration operable to regulate a flow of the coolant fluid 126 in conjunction with the conical flow control poppet 116. In a closed position, the conical flow control poppet 116 may couple to the perforation 118 to block a flow of the coolant fluid 126.

The valve actuator 114 is operable to displace the conical flow control poppet 116 in response to a temperature of the coolant fluid 126. A displacement 120 of the conical flow control poppet 116 by the valve actuator 114 is a function of a temperature of the coolant fluid 126. The function may comprise, for example but without limitation, a proportion of the temperature, a non-linear function of the temperature, or other function of the temperature of the coolant fluid 126. The valve actuator 114 may comprise, for example but without limitation, a flexible bimetallic strip, a shape memory alloy, or other actuator.

In operation, the valve actuator 114 moves the conical flow control poppet 116 within the perforation 118 and into a fluidic passage way 150 of the porous metallic skin 110, partially blocking the coolant flow 138 and controlling the coolant flow 138 based on a temperature of the coolant fluid 126. A high temperature of the coolant fluid 126 causes the valve actuator 114 to increase the coolant flow 138, and a low temperature of the coolant fluid 126 causes the valve actuator 114 to decrease the coolant flow 138. The system 100 makes a transpiration cooling system viable by an efficient coolant flow 138 distribution with the flow regulation valves 112 ensuring that the fluid flow rate 128 of the coolant flow 138 is proportional to a temperature in a local area of the porous metallic skin 110. The valve actuator 114 is fixedly secured at one end to one of: the outer reservoir wall 142 (see FIG. 2) or the inner reservoir wall 144 (as shown in FIG. 1) of the coolant reservoir 146.

The flow regulation valves 112 may comprise, for example but without limitation, about 1.27 cm (0.5 inches) to about 1.52 cm (0.6 inches) length and about 0.64 cm (0.25 inches) to about 0.76 cm (0.3 inches) width, or other suitable dimensions. The conical flow control poppet 116 may comprise, for example but without limitation, about 0.25 cm (0.1 inches) to about 0.38 cm (0.15 inches) length and about 0.64 cm (0.25 inches) diameter, or other dimensions suitable for operation of the flow regulation valves 112. The flow regulation valves 112 may be bonded into the coolant reservoir 146 in an automated manufacturing process.

The coolant flow 138 flows through the porous metallic skin 110 and evaporates out as shown by the coolant fluid vapor 130 at the exposed surface 154 of the porous metallic skin 110 carrying away an aerodynamically induced heat and forming a downstream barrier to heat transfer. The flow regulation valves 112 are configured to control a fluid transfer between the coolant reservoir 146 and the porous metallic skin 110. The flow regulation valves 112 are dispersed in an array pattern 306 (FIG. 3) under the porous metallic skin 110. In this manner, the flow regulation valves 112 control the coolant flow 138 to a high flow rate in high heating areas and to a low flow rate in low heating areas.

The coolant flow 138 migrates through the porous metallic skin 110 in a direction away from the thermally protected structure such as the vehicle 102, evaporates as the temperature increases toward a exposed surface 154 of the porous metallic skin 110, cools the heated porous metallic skin 110, and a resulting coolant fluid vapor 130 creates an additional layer of thermal separation on the exposed surface 154 of the porous metallic skin 110. In this manner, heat dissipation and thermal protection for the thermally protected structure 102 is provided.

The coolant reservoir 146 is configured to receive the coolant fluid 126 from the coolant feed line 136 and distribute the coolant fluid 126 via the coolant flow 138 to form a coolant jacket volume 132 between the outer reservoir wall 142 and the inner reservoir wall 144 of the coolant reservoir 146. The outer reservoir wall 142 and the inner reservoir wall 144 are located opposite to each other (on opposite sides of the coolant reservoir 146). The outer reservoir wall 142 is coupled to the porous metallic skin 110 and inner reservoir wall 144 is located adjacent and/or coupled to the inside 106 of the vehicle 102.

The coolant manifold 134 may be used to couple one or more coolant reservoirs 146, and allow the coolant flow 138 of the coolant fluid 126 between one or more of the coolant reservoirs 146. The coolant manifold 134 may be coupled to one of the coolant reservoirs 146 via a coupling 164/166.

Figure 2:
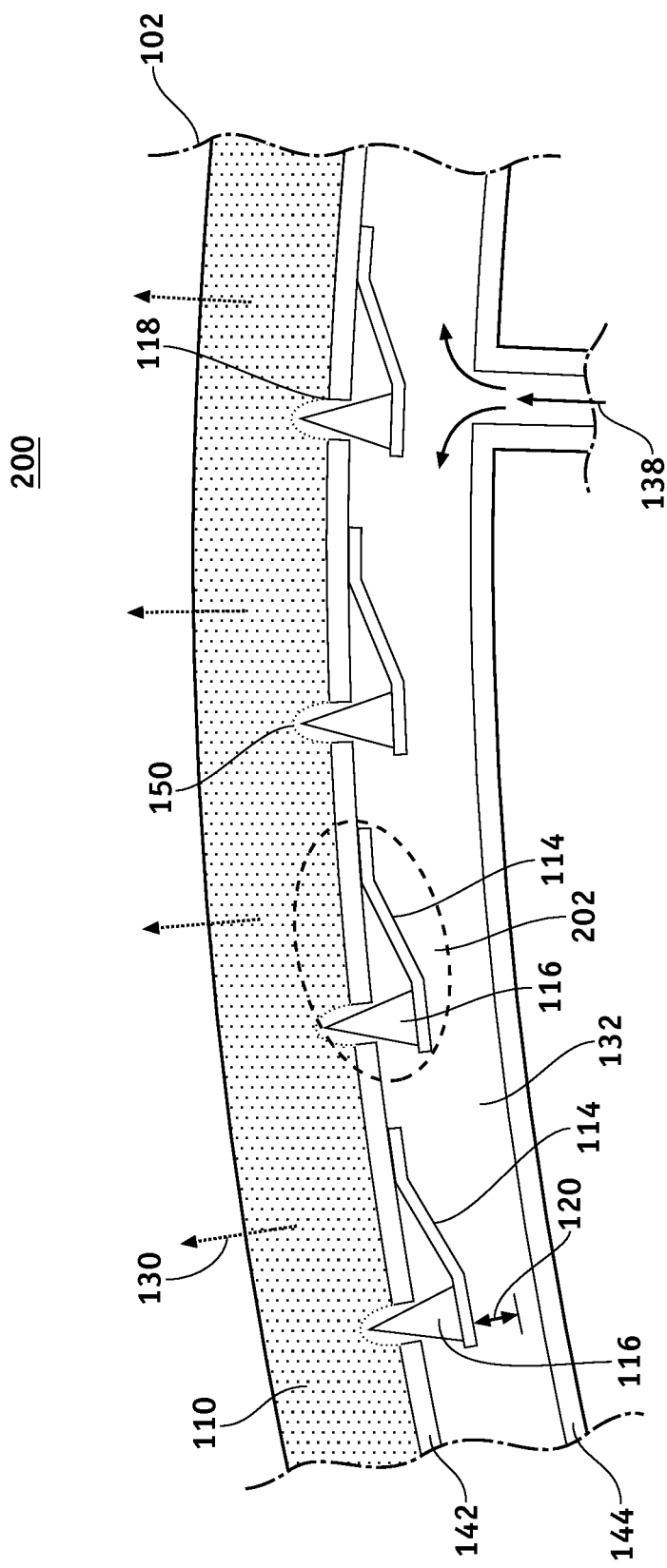
FIG. 2 is an illustration of a cross sectional view of a portion of an exemplary high heat transfer rate reusable thermal protection system of FIG. 1 showing an alternate flow regulation valve according to an embodiment of the disclosure.

FIG. 2 is an illustration of a cross sectional view of a portion of an exemplary high heat transfer rate reusable thermal protection system 200 (system 200) showing an alternate flow regulation valve 202 (controller valve) according to an embodiment of the disclosure. System 200 may comprise functions, material, and structures that are similar to system 100. Therefore, common features, functions, and elements may not be redundantly described here.

Efficient distribution of the coolant flow 138 is provided by the coolant reservoir 146 under the skin structure 108. The flow regulation valve 202 comprises the valve actuator 114 and the conical flow control poppet 116. The valve actuator 114 is coupled to the outer reservoir wall 142 of the coolant reservoir 146.

Figure 3:
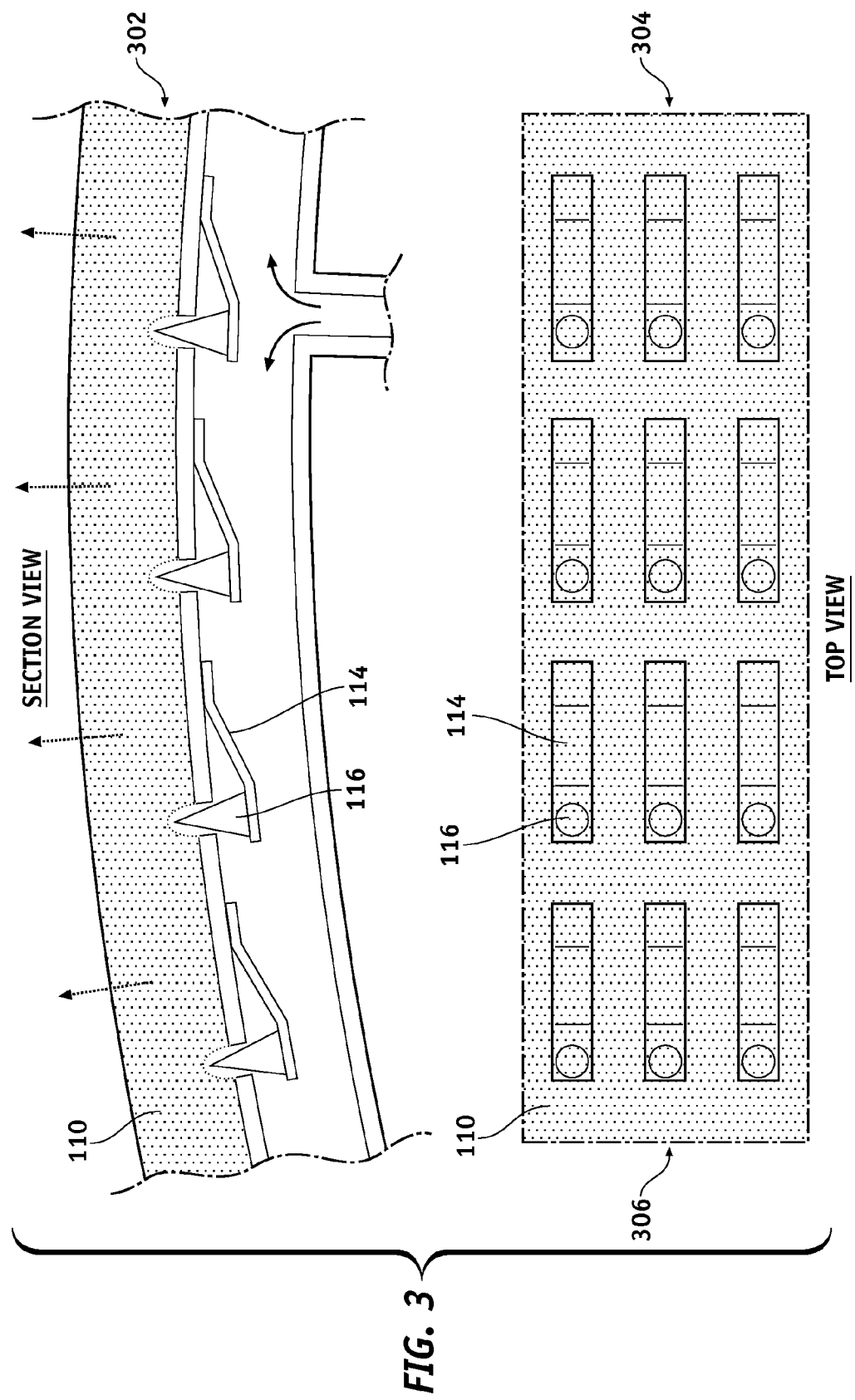
FIG. 3 is an illustration of a sectional view and a top view of a high heat transfer rate reusable thermal protection system showing flow regulation valves dispersed in an array pattern according to an embodiment of the disclosure.

FIG. 3 is an illustration of a sectional view 302 and a top view 304 of a high heat transfer rate reusable thermal protection system 100 showing the flow regulation valves 112 dispersed in the array pattern 306 according to an embodiment of the disclosure.

Figure 4:
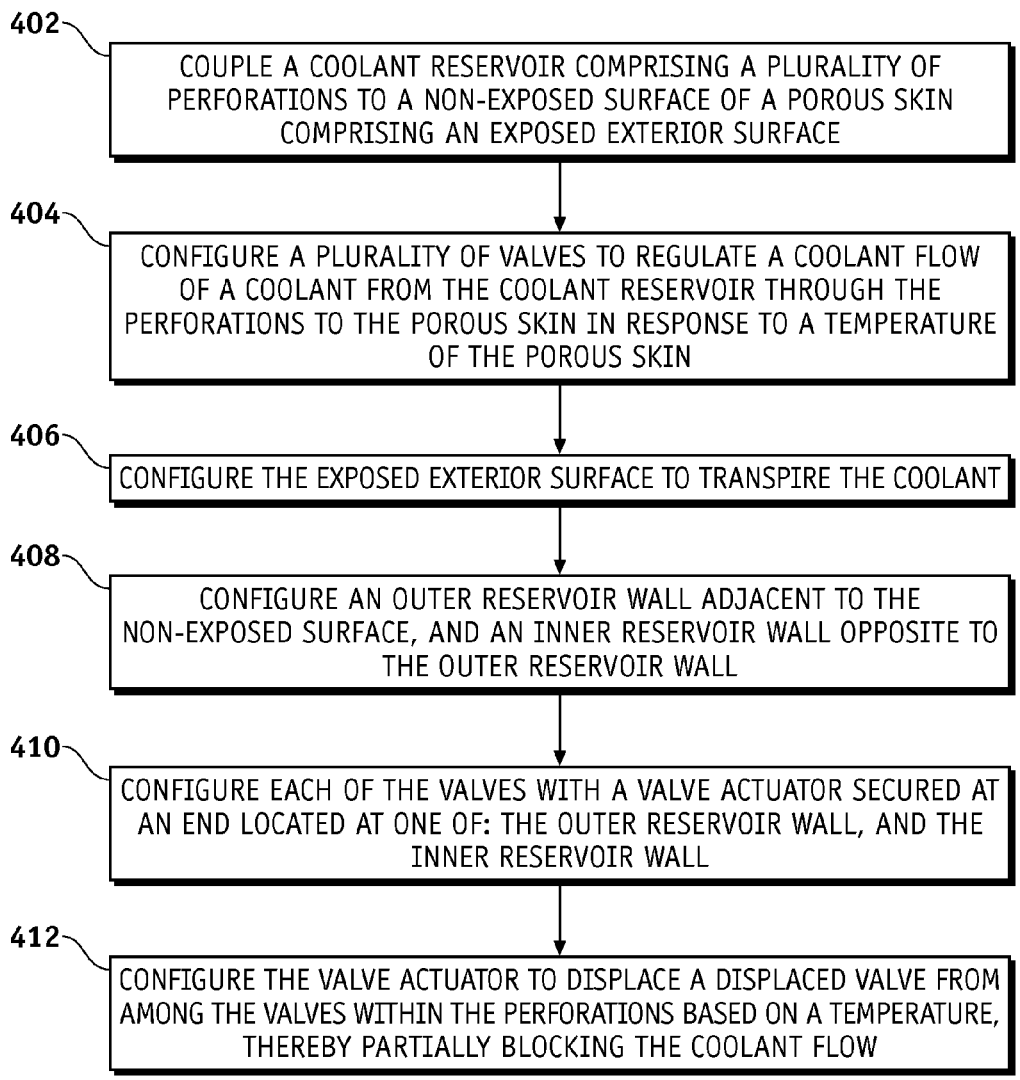
FIG. 4 is an illustration of an exemplary process for operating a high heat transfer rate reusable thermal protection system according to an embodiment of the disclosure.

FIG. 4 is an illustration of an exemplary process 400 for operating a high heat transfer rate reusable thermal protection system according to an embodiment of the disclosure. The various tasks performed in connection with process 400 may be performed by software, hardware, firmware, computer-readable software, computer readable storage medium, a computer-readable medium comprising computer executable instructions for performing the process method, mechanically, or any combination thereof. The process 400 may be recorded in a computer-readable medium such as a semiconductor memory, a magnetic disk, an optical disk, and the like, and can be accessed and executed, for example, by a computer CPU comprising hardware and software such as a processor module in which a computer-readable medium is stored.

For illustrative purposes, the following description of process 400 may refer to elements mentioned above in connection with FIGS. 1-2. In some embodiments, portions of the process 400 may be performed by different elements of the systems 100-200 such as: the skin structure 108, the flow regulation valves 112/202, coolant reservoir 146, etc. The flow regulation valve 112 refers to an embodiment where the flow regulation valve 112 is fixedly secured to the inner reservoir wall 144 in FIG. 1, and the flow regulation valve 202 refers to an embodiment where the flow regulation valve 202 is fixedly secured to the outer reservoir wall 142 in FIG. 2. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Process 400 may comprise functions, material, and structures that are similar to the embodiments shown in FIGS. 1-3. Therefore, common features, functions, and elements may not be redundantly described here.

Process 400 may begin by coupling a coolant reservoir comprising a plurality of perforations to a non-exposed surface of a porous skin comprising an exposed exterior surface (task 402).

Process 400 may continue by configuring a plurality of valves to regulate a coolant flow of a coolant from the coolant reservoir through the perforations to the porous skin in response to a temperature of the porous skin (task 404).

Process 400 may continue by configuring the exposed exterior surface to transpire the coolant (task 406).

Process 400 may continue by configuring an outer reservoir wall 142 adjacent to the non-exposed surface, and an inner reservoir wall 144 opposite to the outer reservoir wall 142 (task 408). The out reservoir wall comprises a side of the coolant reservoir 146 of opposite to the outer reservoir wall 142.

Process 400 may continue by configuring each of the valves with a valve actuator secured at an end located at one of: the outer reservoir wall 142, and the inner reservoir wall 144 (task 410).

Process 400 may continue by configuring the valve actuator to displace a displaced valve from among the valves within the perforations based on a temperature, thereby partially blocking the coolant flow (task 412).

Figure 5:
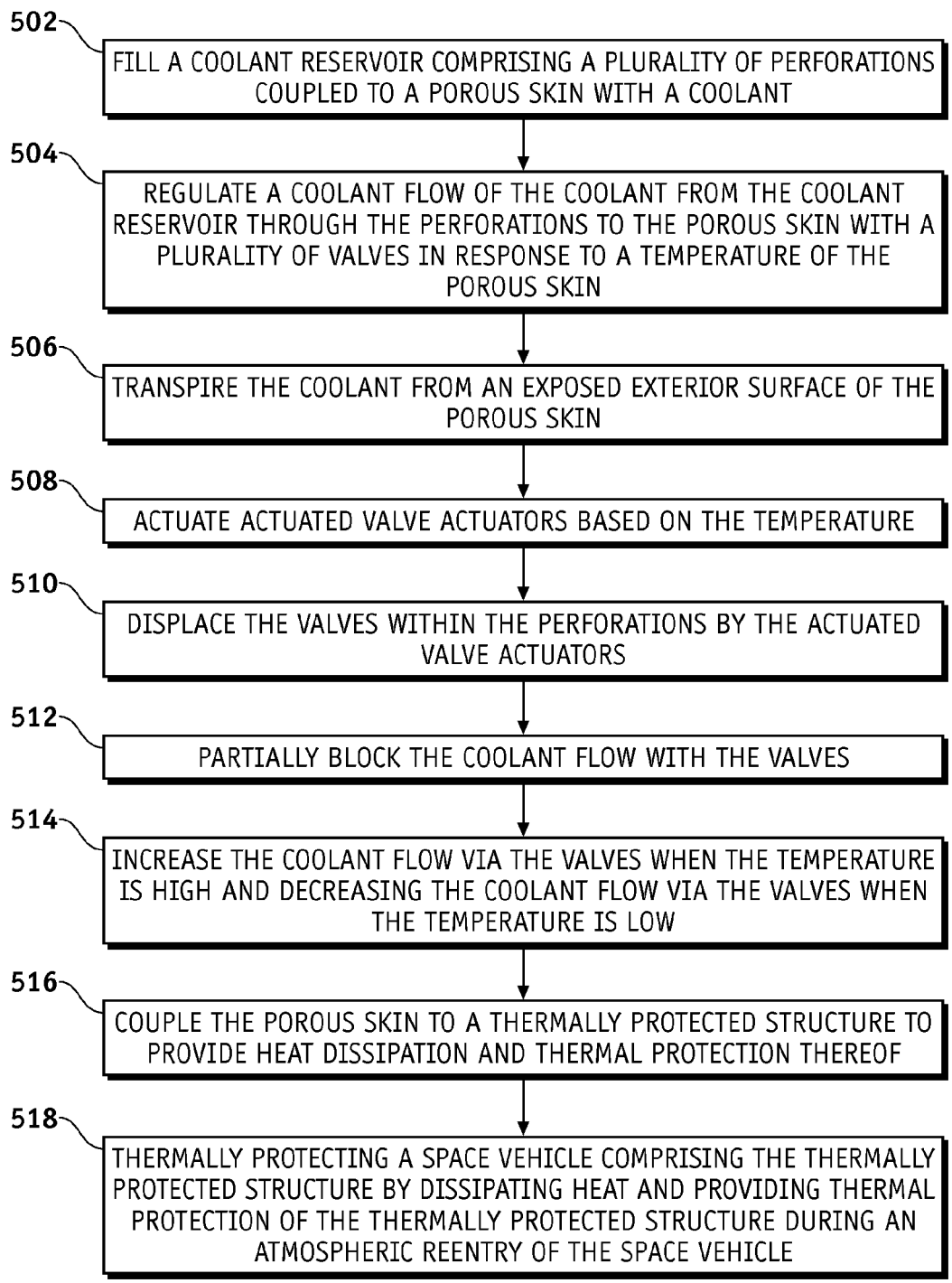
FIG. 5 is an illustration of an exemplary process for forming a high heat transfer rate reusable thermal protection system according to an embodiment of the disclosure.

FIG. 5 is an illustration of an exemplary process for forming a high heat transfer rate reusable thermal protection system according to an embodiment of the disclosure. The various tasks performed in connection with process 500 may be performed mechanically, by software, hardware, firmware, computer-readable software, computer readable storage medium, or any combination thereof. The process 500 may be recorded in a computer-readable medium such as a semiconductor memory, a magnetic disk, an optical disk, and the like, and can be accessed and executed, for example, by a computer CPU such as a processor module in which a computer-readable medium is stored.

For illustrative purposes, the following description of process 500 may refer to elements mentioned above in connection with FIGS. 1-3. In some embodiments, portions of the process 500 may be performed by different elements of the systems 100-200 such as: the skin structure 108, the flow regulation valves 112/202, coolant reservoir 146, etc. It should be appreciated that process 500 may include any number of additional or alternative tasks, the tasks shown in FIG. 5 need not be performed in the illustrated order, and the process 500 may be incorporated into a more comprehensive procedure or process having additional functionality not described in detail herein.

Process 500 may begin by filling a coolant reservoir comprising a plurality of perforations coupled to a porous skin with a coolant (task 502).

Process 500 may continue by regulating a coolant flow of the coolant from the coolant reservoir through the perforations to the porous skin with a plurality of valves in response to a temperature of the porous skin (task 504).

Process 500 may continue by transpiring the coolant from an exposed exterior surface of the porous skin (task 506).

Process 500 may continue by actuating actuated valve actuators based on the temperature (task 508).

Process 500 may continue by displacing the valves within the perforations by the actuated valve actuators (task 510).

Process 500 may continue by partially blocking the coolant flow with the valves (task 512).

Process 500 may continue by increasing the coolant flow via the valves when the temperature is high and decreasing the coolant flow via the valves when the temperature is low (task 514).

Process 500 may continue by coupling the porous skin to a thermally protected structure to provide heat dissipation and thermal protection thereof (task 516).

Process 500 may continue by thermally protecting a space vehicle comprising the thermally protected structure by dissipating heat and providing thermal protection of the thermally protected structure during an atmospheric reentry of the space vehicle (task 518).

In this manner, embodiments of the disclosure provide a means to protect a vehicle skin able to withstand heating effects and high temperatures.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A heat dissipation and thermal protection system for a vehicle, the system comprising:
   a porous skin comprising an exposed exterior surface and a non-exposed surface;
   a coolant reservoir coupled to the non-exposed surface, the coolant reservoir comprising a plurality of perforations; and
   a plurality of valves operable to regulate a coolant flow of a coolant fluid from the coolant reservoir to the porous skin in response to a temperature of the porous skin, wherein each of the plurality of valves extends from the coolant reservoir into the porous skin via a respective one of the plurality of perforations.

2. The system of claim 1, wherein the exposed exterior surface transpires the coolant fluid.

3. The system of claim 1, wherein the reservoir comprises an outer reservoir wall adjacent to the non-exposed surface, and an inner reservoir wall opposite to the outer reservoir wall.

4. The system of claim 3, wherein each of the plurality of valves comprises:
 a control poppet operable to move within a perforation from among the plurality of perforations to regulate the coolant flow of the coolant fluid through the perforation; and
 a valve actuator operable to displace the control poppet in response to the temperature of the coolant flow, the valve actuator fixedly secured at one end to the inner reservoir wall.

5. The system of claim 4, wherein the valve actuator is operable to move the control poppet within the perforation based on the temperature, thereby partially blocking the coolant flow.

6. The system of claim 5, wherein the coolant flow increases when the temperature is high and the coolant flow decreases when the temperature is low.

7. The system of claim 4, wherein the valve actuator comprises at least one of: a flexible bimetallic strip or a shape memory alloy.

8. The system of claim 1, wherein the porous skin is reusable and is not ablated.

9. The system of claim 8, wherein the porous skin is coupled to a thermally protected structure to provide heat dissipation and thermal protection thereof.

10. A method for forming a heat dissipation and thermal protection system for a vehicle, the method comprising:
 coupling a coolant reservoir to a non-exposed surface of a porous skin comprising an exposed exterior surface, the coolant reservoir comprising a plurality of perforations; and
 configuring a plurality of valves to regulate a coolant flow of a coolant fluid from the coolant reservoir through the plurality of perforations to the porous skin in response to a temperature of the porous skin, wherein each of the plurality of valves extends from the coolant reservoir into the porous skin via a respective one of the plurality of perforations.

11. The method of claim 10, further comprising configuring the exposed exterior surface to transpire the coolant fluid.

12. The method of claim 10, further comprising configuring an outer reservoir wall adjacent to the non-exposed surface, and an inner reservoir wall opposite the outer reservoir wall.

13. The method of claim 12, further comprising configuring each of the plurality of valves with a respective valve actuator coupled fixedly secured at an end located at the inner reservoir wall.

14. The method of claim 13, further comprising configuring the valve actuator to displace a displaced valve from among the plurality of valves within the plurality of perforations based on temperature, thereby partially blocking the coolant flow.

15. A method for dissipating heat and providing thermal protection for a vehicle, the method comprising:
 filling a coolant reservoir coupled to a porous skin with a coolant fluid, the coolant reservoir comprising a plurality of perforations; and
 regulating a coolant flow of a coolant from the coolant reservoir through the plurality of perforations to the porous skin using a plurality of valves in response to a temperature of the porous skin, wherein each of the plurality of valves extends from the coolant reservoir into the porous skin via a respective one of the plurality of perforations.

16. The method of claim 15, further comprising transpiring the coolant from an exposed exterior surface of the porous skin.

17. The method of claim 15, further comprising:
 actuating a plurality of actuated valve actuators based on the temperature;
 displacing the plurality of valves within the plurality of perforations by the plurality of actuated valve actuators; and
 partially blocking the coolant flow with the plurality of valves.

18. The method of claim 15, further comprising increasing the coolant flow via the plurality of valves when the temperature is high and decreasing the coolant flow via the plurality of valves when the temperature is low.

19. The method of claim 15, further comprising coupling the porous skin to a thermally protected structure to provide heat dissipation and thermal protection thereof.

20. The method of claim 19, wherein the vehicle is a space vehicle, the method further comprising thermally protecting the space vehicle comprising the thermally protected structure by dissipating heat and providing thermal protection of the thermally protected structure during an atmospheric reentry of the space vehicle.

* * * * *